US007006141B1

(12) United States Patent
Neil et al.

(10) Patent No.: US 7,006,141 B1
(45) Date of Patent: Feb. 28, 2006

(54) METHOD AND OBJECTIVE LENS FOR SPECTRALLY MODIFYING LIGHT FOR AN ELECTRONIC CAMERA

(75) Inventors: Iain A. Neil, Calabasas, CA (US); John J. Galt, Glendale, CA (US)

(73) Assignee: Panavision, Inc., Woodland Hills, CA (US)

(*) Notice: Subject to any disclaimer, the term of this patent is extended or adjusted under 35 U.S.C. 154(b) by 0 days.

(21) Appl. No.: 09/447,837

(22) Filed: Nov. 23, 1999

(51) Int. Cl.
*H04N 5/225* (2006.01)
*H04N 5/72* (2006.01)
*G03B 17/00* (2006.01)

(52) U.S. Cl. ...................... 348/360; 348/342; 348/835; 396/71

(58) Field of Classification Search ................ 348/342, 348/360, 835; 396/71
See application file for complete search history.

(56) References Cited

U.S. PATENT DOCUMENTS

| | | | | |
|---|---|---|---|---|
| 3,981,562 A | | 9/1976 | Anthon | |
| 5,007,719 A | | 4/1991 | Hasegawa | |
| 5,029,010 A | | 7/1991 | Shiraishi | |
| 5,282,043 A | | 1/1994 | Cochard et al. | |
| 5,442,438 A | | 8/1995 | Batchelder et al. | |
| 5,568,197 A | * | 10/1996 | Hamano | 348/342 |
| 5,646,781 A | * | 7/1997 | Johnson, Jr. | 359/589 |
| 5,841,577 A | | 11/1998 | Wachman et al. | |
| 5,953,082 A | | 9/1999 | Butcher | |
| 6,040,857 A | | 3/2000 | Hirsh et al. | |
| 6,088,059 A | * | 7/2000 | Mihara et al. | 348/335 |
| 6,104,432 A | * | 8/2000 | Nakamura et al. | 348/360 |
| 6,157,781 A | * | 12/2000 | Konno et al. | 396/71 |
| 6,218,081 B1 | | 4/2001 | Nishiwaki | |
| 6,297,912 B1 | | 10/2001 | Goto | |
| 6,690,467 B1 | | 2/2004 | Reel | |

FOREIGN PATENT DOCUMENTS

| | | |
|---|---|---|
| EP | 0 618 470 | 10/1994 |
| GB | 2 259 373 A | 3/1993 |
| JP | 63-87922 | 11/1988 |
| JP | 3-50592 | 3/1991 |
| JP | 2000-089114 | 3/2000 |

* cited by examiner

*Primary Examiner*—Thai Tran
*Assistant Examiner*—James M. Hannett
(74) *Attorney, Agent, or Firm*—Morrison & Foerster LLP

(57) ABSTRACT

A method for modifying the spectrum of light rays passing through an objective lens to an electronic camera that includes providing an interference type filter within the objective lens. The interference type filter may be a coating on a separate optical element added to the objective lens or on a normal optical component of the objective lens. The interference filter coating is located along the optical axis where the light rays are substantially collimated and have a minimum light ray incidence angle with respect to the coating surface, which angle should not exceed 15 degrees for any of the light rays passing therethrough.

22 Claims, 5 Drawing Sheets

3 CCD CAMERA

INTERFERENCE FILTER

INTERFERENCE FILTER

3 CCD CAMERA + INTERFERENCE FILTER

METHOD AND OBJECTIVE LENS FOR SPECTRALLY MODIFYING LIGHT FOR AN ELECTRONIC CAMERA

CROSS-REFERENCE TO RELATED APPLICATION

This application is related to application Ser. No. 09/663,277, filed on Sep. 15, 2000, which application is specifically incorporated herein, in its entirety, by reference.

The present invention relates to an objective lens for an electronic camera and, in particular, to such a lens and method for spectrally modifying the light supplied to the camera to a predetermined spectrum of light rays for any desired purpose.

Recent advances in Charge Coupled Device (CCD) technology have enabled electronic cameras to be built having resolution capabilities which rival conventional 35 mm motion picture film. Video cameras are being developed using high resolution CDDs (approximately 2 million pixels per color) which will operate at the nominal frame speed of a motion picture camera (24 frames per second). These cameras are being developed as replacements for film cameras, at least for some applications. However, for the foreseeable future film and digital cameras will need to coexist in a hybrid production environment, which will exploit the unique capabilities of both imaging mediums.

Modern motion picture film imaging utilizing an image size of approximately 18 mm by 24 mm is the result of an evolution of science, art and craft which has taken place over a period of 1100 years. Any new imaging technology must be able to integrate within this established aesthetic paradigm. Historically, video cameras have largely been designed to mimic the spectral response of the human eye. However, film colorimetry has mostly departed from "ideal" colorimetry for both aesthetic and technical reasons. These new digital imaging cameras will need to be able to mimic the colorimetry of a variety of different film emulsions and other effects obtained with film. Although mathematical transformations from one color space to another are relatively straightforward, these transformations assume that, even where different imaging systems may have different responses to color, one system is not blind to colors that the other sees. However, when the spectral response of video cameras and film emulsions are compared this is the case. For example, film emulsions have red and blue channel responses which peak where today's video cameras have very low responses. Thus, if both video and film cameras are used for different segments of a single production, the color from a video segment to a film segment will change and may be visually objectionable or at least noticeable.

Traditionally, colored filters on dyed glass, gelatin, or plastic substrates have been used to modify by absorption the spectral characteristics of light in photographic processes. However, the slope (i.e. the tangent of the angle on a graph of light wavelengths) of the spectral response using these types of filters, which work by the selective absorption of light of different wavelengths, is very gradual and hard to control. Interference filters, which consist of a series of very thin coatings which result in constructive and destructive interference of particular wavelengths can have much steeper slopes, higher efficiency, and more complex but predictable bandpass characteristics, than absorption type filters. The major disadvantage of an interference type of filter for photographic applications is that their spectral characteristics can vary greatly depending on the incident angle of the light ray at the surface of the filter coating. This could mean for instance that such a filter, used with a zoom lens, would vary in its spectral characteristics as the focal length and hence the angle of view of the lens was changed.

It should be noted that introducing such an interference filter in front of the lens is possible but due to the varying angles of light beams over the field of view the spectral characteristics of the filter will vary which is a disadvantage. Also, depending on the focal length and aperture of the lens, the filter may become very large in size, weight and cost. Further, by locating an interference type filter in the video camera after the lens, the filter will encounter light beams which are convergent and hence the same problem arises concerning the resultant spectral characteristics.

SUMMARY OF THE INVENTION

It is an object of the present invention to provide a method and objective lens for use with an electronic camera for modifying the light passing through the lens to a predetermined spectrum of light rays being supplied to the electronic camera for causing the camera to record a desired colorimetry, shading or the like.

In the preferred embodiment of the present invention, the objective lens is provided with an optical element on the optical axis at a location where the light rays are substantially collimated and a coating is provided on that optical element to perform as an interference filter for producing the predetermined spectrum of light for the electronic camera. Preferably, that optical element is of zero optical power for minimizing the optical effect thereof and is replaceable with comparable optical elements having either different coatings for producing different predetermined spectrums of light rays or no coating for allowing the natural spectrum of light waves to be supplied to the electronic camera. A further object of this invention is to provide a lens with such an optical element with interference filter coatings that produce a predetermined spectrum of light waves supplied to the video camera that can match a specific spectrum recorded on film, match real colors, produce desired shading or the like.

BRIEF DESCRIPTION OF THE DRAWINGS

Other objects, advantages and features of the present invention will appear from the detailed description of preferred embodiments and the accompanying drawings, wherein.

7, but of lower resolution and electronically smoothed curves to represent the emerging light waves more generally.

DETAILED DESCRIPTION OF THE PREFERRED EMBODIMENTS OF THE INVENTION

The present invention will be described in connection with two different types of high performance lenses, namely, a high performance zoom lens shown in FIGS. 1–4 and a high performance prime or fixed focal length lens shown in FIG. 5, which lenses are of a quality for use in cinematography, high definition television, advanced television and the like. The zoom lens of FIGS. 1–4 and the prime lens of FIG. 5 are lenses that include the interference filter element and method of the present invention in an appropriate manner but are otherwise conventional lenses, although it may be beneficial in some instances to specifically design a lens with appropriate characteristics for using the present invention.

Figure 1:
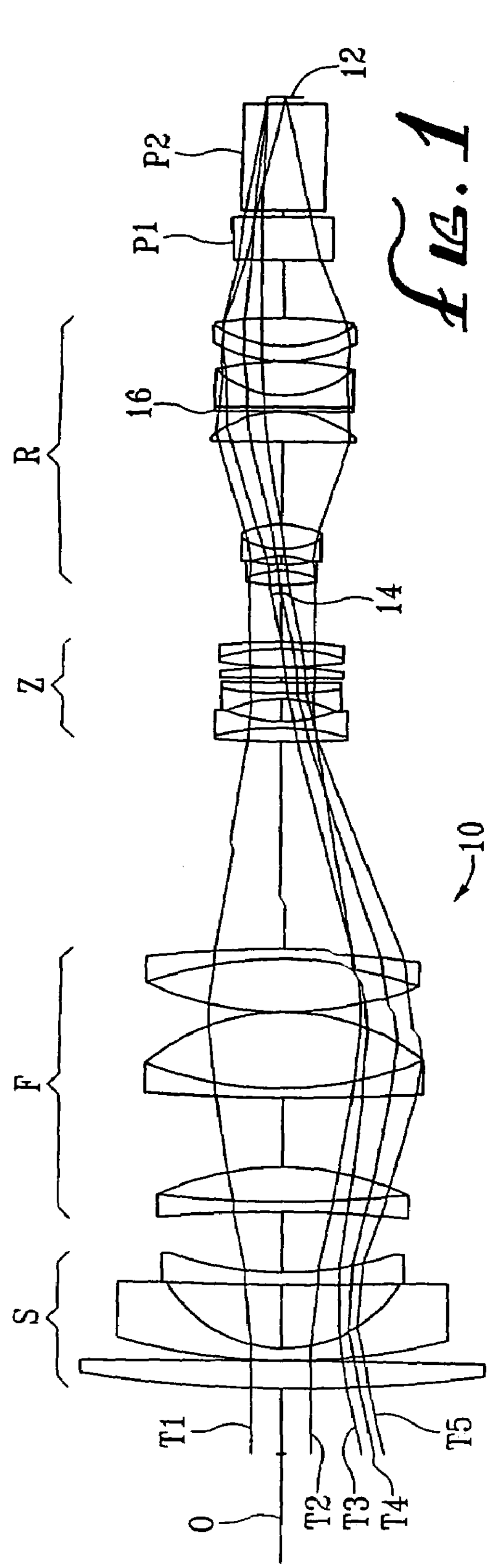
FIG. 1 is an optical diagram of an objective lens of the zoom type having a variable focal length, with the present invention incorporated in the lens.

Referring now to FIG. 1, the zoom lens 10 has the requisite groups of lens elements including a stationary objective lens group S, a focus lens group F, a zoom lens group Z, and a relay lens group R, with prisms P1 and P2, aligned on an optical axis O from the front of the lens near object space to the rear of the lens at the image plane 12 (i.e. from left to right as viewed in FIG. 1, as well as FIGS. 2–5). The illustrated zoom lens 10 has a focal length range from about 6 mm to 26 mm but the present invention is applicable to a zoom lens of any range of focal lengths. Further, the illustrated zoom lens 10 has two lens groups forming the focus group F and two other lens groups forming the zoom group Z, each of which lens groups are movable relative to each other for accomplishing focusing at all appropriate distances and zooming for the full range of focal lengths, but more or fewer lens groups could be used to perform those functions. An optical stop or iris 14 is provided immediately in front of the relay lens group R. A representative number of light ray tracings T1–T5 are shown in the optical diagrams of FIGS. 1–5 for illustrating the light ray paths and the angles of incident of such light ray paths at the various optical elements, the importance of which will be discussed below. As thus far described with respect to FIG. 1, the zoom lens is relatively conventional and these conventional portions are the same for the zoom lens of FIG. 3 and the enlarged optical diagrams of FIGS. 2 and 4.

Figure 2:
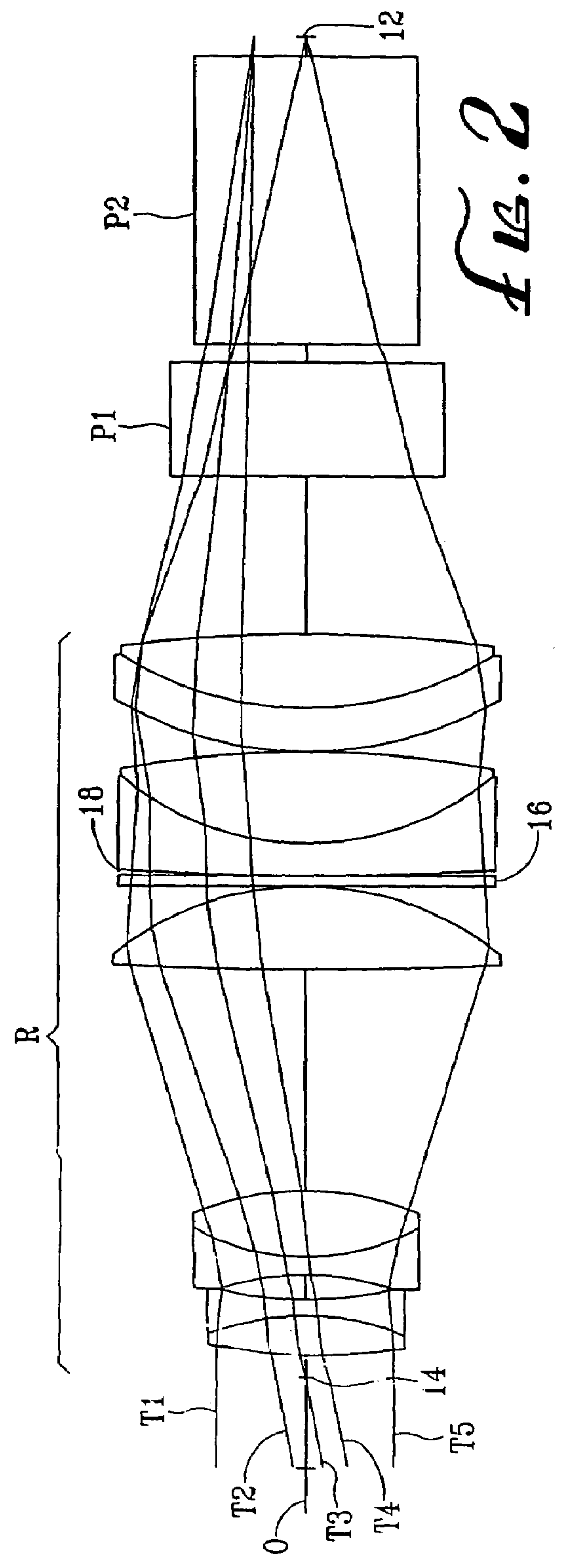
FIG. 2 is an enlarged view of a portion of the optical diagram of FIG. 1.

Referring also to FIG. 2, which is an enlargement of the portion of FIG. 1 illustrating the elements between the iris 14 and the image plane 12, an optical element 16 comprising the interference filter portion of the present invention is positioned on the optical axis O among the lens elements forming the relay lens group R. Preferably, the optical element 16 is removable and replaceable from externally of the lens housing (not shown) that supports the lens elements illustrated in the optical diagrams of FIGS. 1 and 2, whereby the filtering characteristics of optical element 16 may be varied to match the desired results. The optical element 16 is preferably comprised of an optically flat glass plate with an appropriate interference filter coating, although the substrate may be comprised of suitable materials other than glass. If the optical element 16 is removable and replaceable, as is preferable, then a clear substrate of the same material and thickness may be substituted when no modification of the light ray spectrum is desired, such as when the electronic camera is being used for conventional purposes.

The interference filter coating on optical element 16 may be of any conventional type such as described in U.S. Pat. No. 5,646,781 "Optical Filter For Forming Enhanced Images", the disclosure of which is incorporated herein by this reference as though set forth in full and therefore will not be described in detail. The interference filter coatings of the type disclosed in said patent are commercially available under the trademark "Colormax" from Omega Optical, Inc., Brattleboro, Vt., assignee of said patent. As described in that patent, the interference filter coating is comprised of layers of low refractive index material and layers of high refractive index material stacked adjacent to each other, which materials are appropriately selected and positioned in respective layers for eliminating "undesired wavelengths of electromagnetic radiation" to thereby allow only "desired wavelengths of light", as those quoted phrases are specifically defined in the patent, to allow only designated wavebands of light to pass through the optical element 16 and eventually reach the image plane 12. As used herein, the phrase "predetermined spectrum of light rays" shall designate the "desired wavelengths of light" defined in the patent, which spectrum is specifically designed and selected for being supplied to the charge couple devices (CCDs) of the electronic camera (not shown) in accordance with the present invention. Thus, a predetermined spectrum of light rays can be selected and specified for accomplishing any desired modification of the light rays to produce a desired result at the electronic camera, such as matching the spectrum of light rays recorded on film by a film camera, matching the real colors of the object photographed by the electronic camera, producing desired shading or tinting, and the like.

Figure 6:
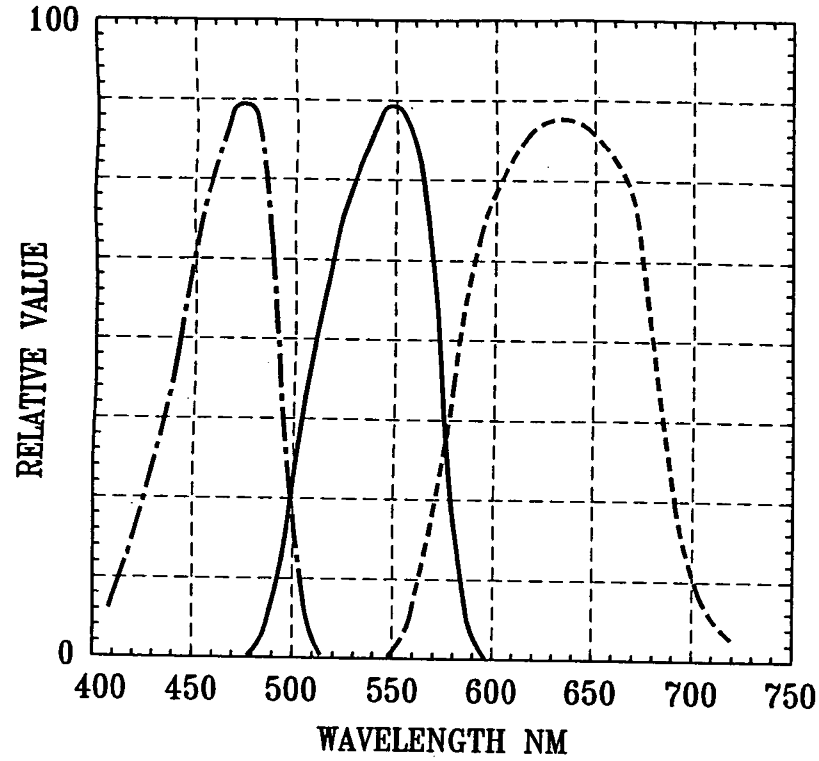
FIG. 6 is a spectralgraph of the relative values of lightwaves recorded by the three charge couple devices of a video camera having a normal, unfiltered lens.
Figure 7:
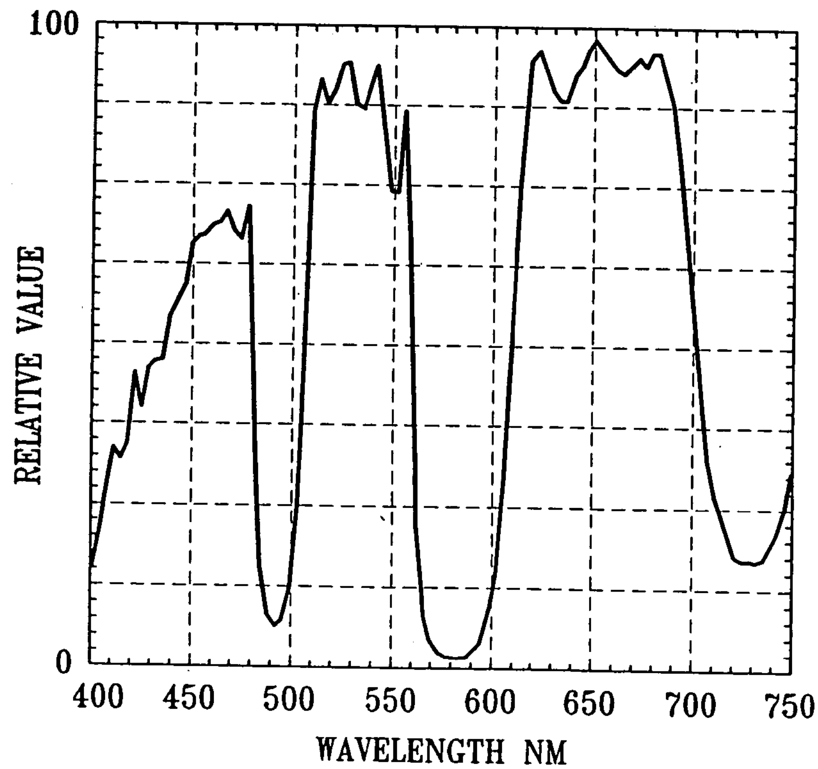
FIG. 7 is a spectralgraph having a very high resolution of the relative values of lightwaves emerging from a typical interference filter used in a lens in the present invention.
Figure 8:
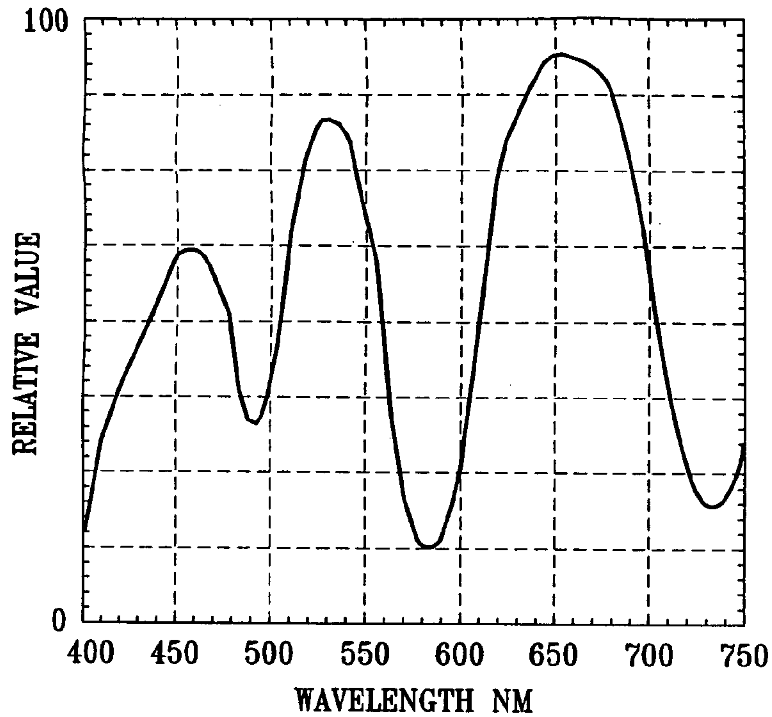
FIG. 8 is a spectralgraph of the relative values of lightwaves emerging from a typical interference filter, as in FIG.
Figure 9:
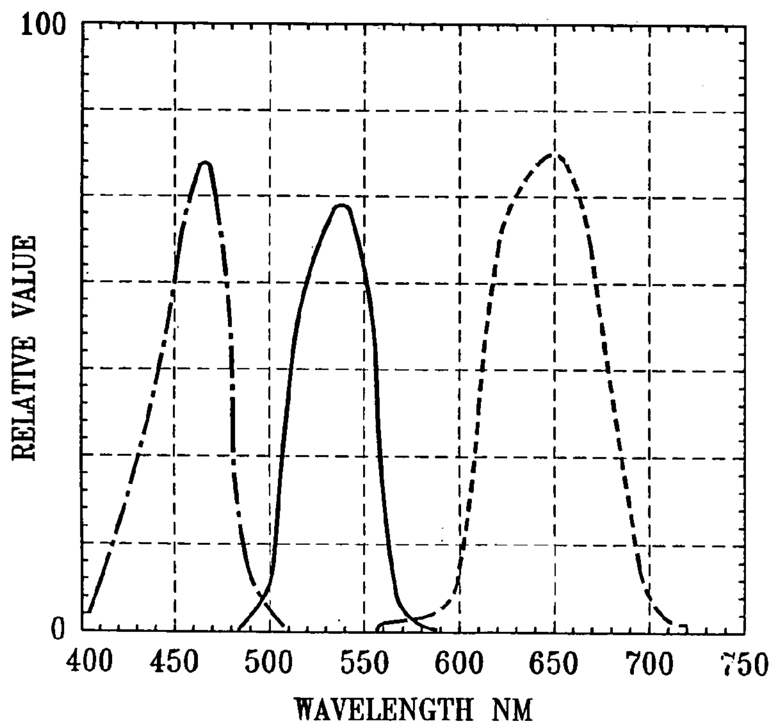
FIG. 9 is a spectralgraph illustrating the combination of the spectralgraphs of FIGS. 6 and 8, namely, the response of a video camera having three charge couple devices and a lens with the interference filter of this invention.

Referring now to FIGS. 6–9, one example of a practical application of the present invention is illustrated with respect to the spectrum of light rays received and recorded by an electronic camera having three CCDs with and without the interference filter formed by optical element 16 of the present invention. Each of FIGS. 6–9 comprises a spectralgraph of the relative values of the respective wavelengths of the light rays supplied to the electronic camera or passing through the filter. The passbands of light rays corresponding to the primary colors are separately shown in FIGS. 6 and 9 by the solid line G representing green, the dash-dot line B representing blue and the dashed line R representing red, whereas in FIGS. 7 and 8 the measured light rays passing through the interference filter are shown in a continuous, single line graph, although again the peaks of the graph represent the primary colors, from left to right, of blue, green and red. The spectralgraph of FIG. 6 representing the relative values of light rays reaching the three CCD camera illustrate that while the peak values of the primary colors are separated at approximately 470 nm, 550 nm and 640 nm, the blue and green light rays overlap substantially at about 500 nm and the green and red light rays overlap substantially at about 575 nm, which overlap may not be visually apparent on a video monitor screen but is significantly different than is recorded on film emulsions and projected on a movie screen. FIGS. 7 and 8 are spectralgraphs of an interference filter comprising the aforedescribed optical element 16 with a coating of layers specifically designed to produce a predetermined spectrum of light rays generally corresponding to the spectrum of light rays recorded by a particular film. FIG. 7 is a very high resolution spectralgraph for illustrating precisely the wavelengths of the light rays emerging from the interference filter and the substantial separation of the primary colors, as shown by the deep valleys in the graph at about 490 nm and 580 nm, whereby the interference filter of optical element 16 passes substantially only the primary colors without the overlap between the primary colors. The spectralgraph of FIG. 8 is of the same interference filter illustrated in FIG. 7 but of lesser resolution and with the curves electronically smoothed in a conventional manner to more closely correspond to the relative values illustrated in FIG. 6 for the light rays reaching the three CCD camera. The spectralgraph of FIG. 9 illustrates the light rays reaching the three CCD camera through the interference filter represented by the spectralgraphs of FIGS. 7 and 8, such as an interference filter optical element 16 in a lens 10 on a three CCD camera. As illustrated by FIG. 9, the relative values of the filtered light rays, as recorded by the camera, peak at the primary colors and there is substantial separation between the primary colors as shown by the deep valleys at about 500 nm and 580 nm. Thus, an electronic camera using the lens 10 having the interference filter optical element 16 can record for reproduction an image having the same relative values of the primary colors as a film emulsion that has approximately the relative values illustrated in FIG. 9. This permits, for example, electronic cameras and film cameras to be used interchangeably in recording scenes for the same movie or other production and yet minimizing or eliminating any difference in the reproduced colors from one scene to another using an electronic camera for one scene and a film camera for the other.

Referring again to FIGS. 1 and 2, the location of the interference filter optical element 16 is specifically selected or designed to be positioned along the optical axis O at a point where the light rays are substantially collimated, i.e. substantially parallel, without interfering with the other optical elements. As illustrated in FIGS. 1 and 2, optical element 16 is located within the optical elements of the relay lens group R and the light ray tracings T1–T5 are substantially parallel to the optical axis O as those tracings pass through the optical element 16. It has been found that the interference filter coating formed by layers of low and high refractive index materials, as described in the aforementioned U.S. Pat. No. 5,646,781, perform more effectively when the angle of incident on the interference filter coating is as close to perpendicular as possible and preferably not more than 15 degrees at any point on the surface, which will be referred to as "substantially perpendicular". Thus, since optical element 16 is flat and perpendicular to the optical axis O, preferably the light ray tracings across the entire effective surface of the optical element 16 are substantially parallel to the optical axis O, as shown by tracings T1–T5. In zoom lens 10 of FIGS. 1–4, the angle between the flat surface of optical element 16 and the light rays is not exactly 90°, except on the optical axis O, and is not the same across the entire surface of optical element 16, but rather the angle varies. Specifically, at the illustrated location of optical element 16, the "ray incident angle" (the angle of the light ray with respect to a line perpendicular to the surface) varies from zero to a maximum angle of about 4.7°. Further, the location of interference filter element 16 is such that the focusing adjustments and zooming movements of the lens 10 do not change the ray incident angles at element 16.

As an alternative to providing a separate optical element 16 with the interference filter coating, if the lens 10 is designed for a single purpose, such as simulating a specific film emulsion, the interference filter coating may be provided on the surface of one of the other optical elements in the lens 10 having a surface substantially perpendicular to the light ray tracings, such as surface 18 in FIG. 2, even though such a surface is not flat.

Figure 3:
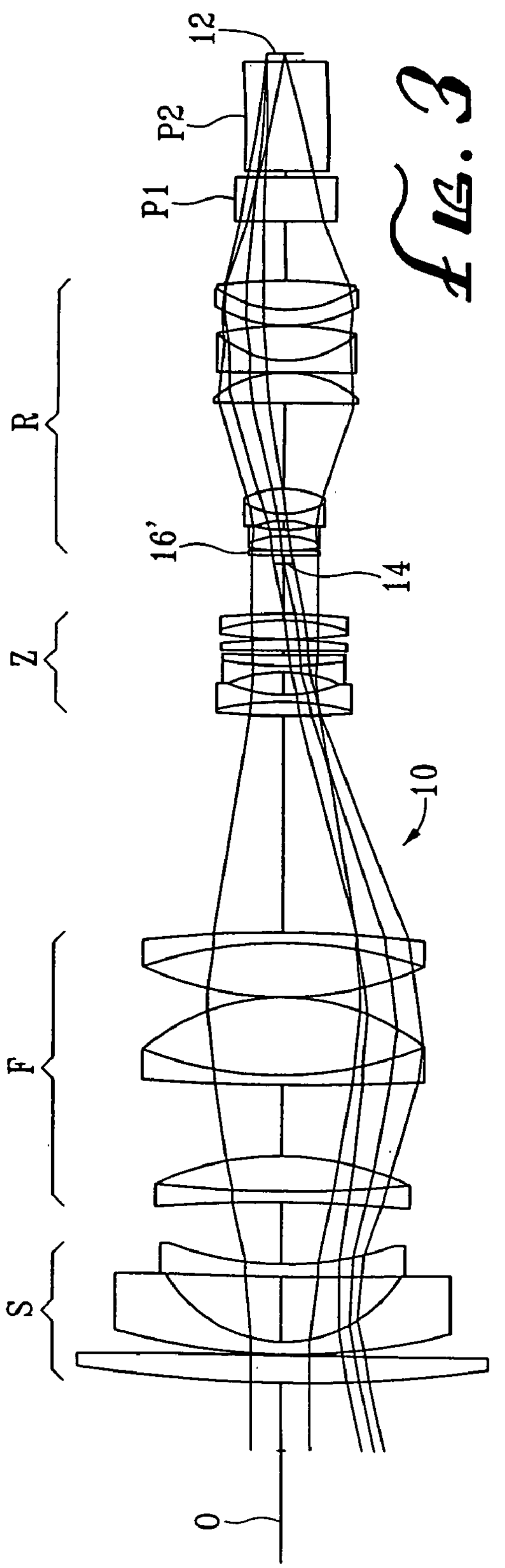
FIG. 3 is an optical diagram of the zoom lens of FIG. 1 but with the interference filter element of the present invention positioned at a different location along the optical axis.
Figure 4:
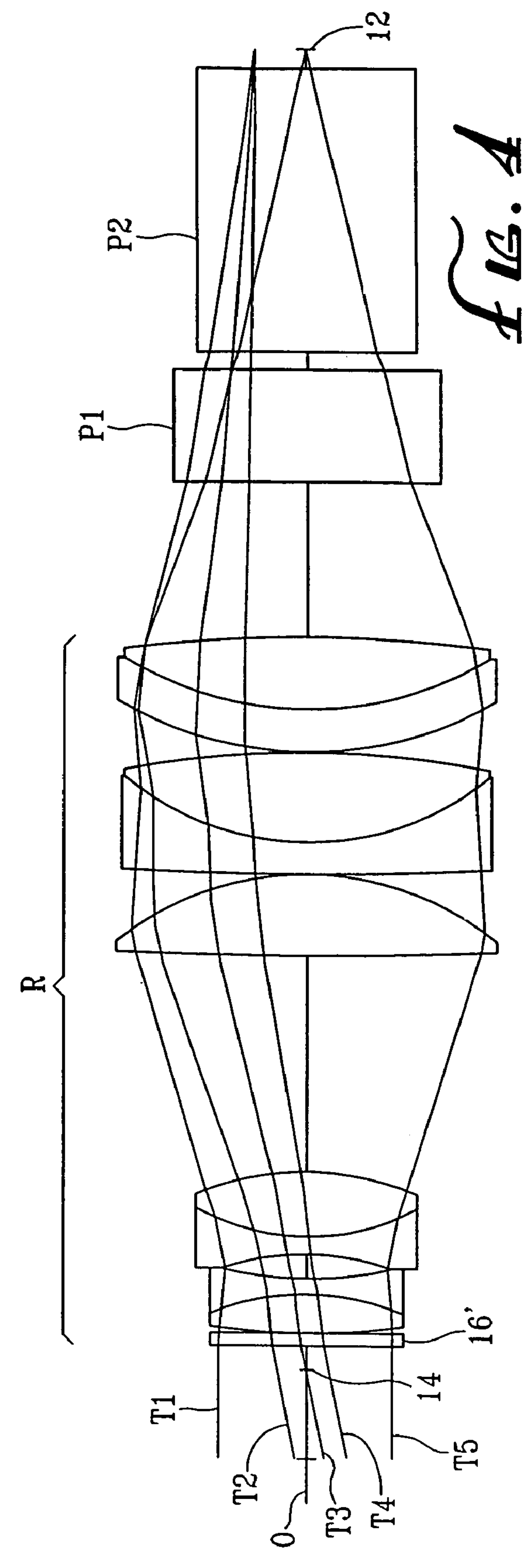
FIG. 4 is an enlarged view of a portion of the optical diagram of FIG. 3.
Figure 5:
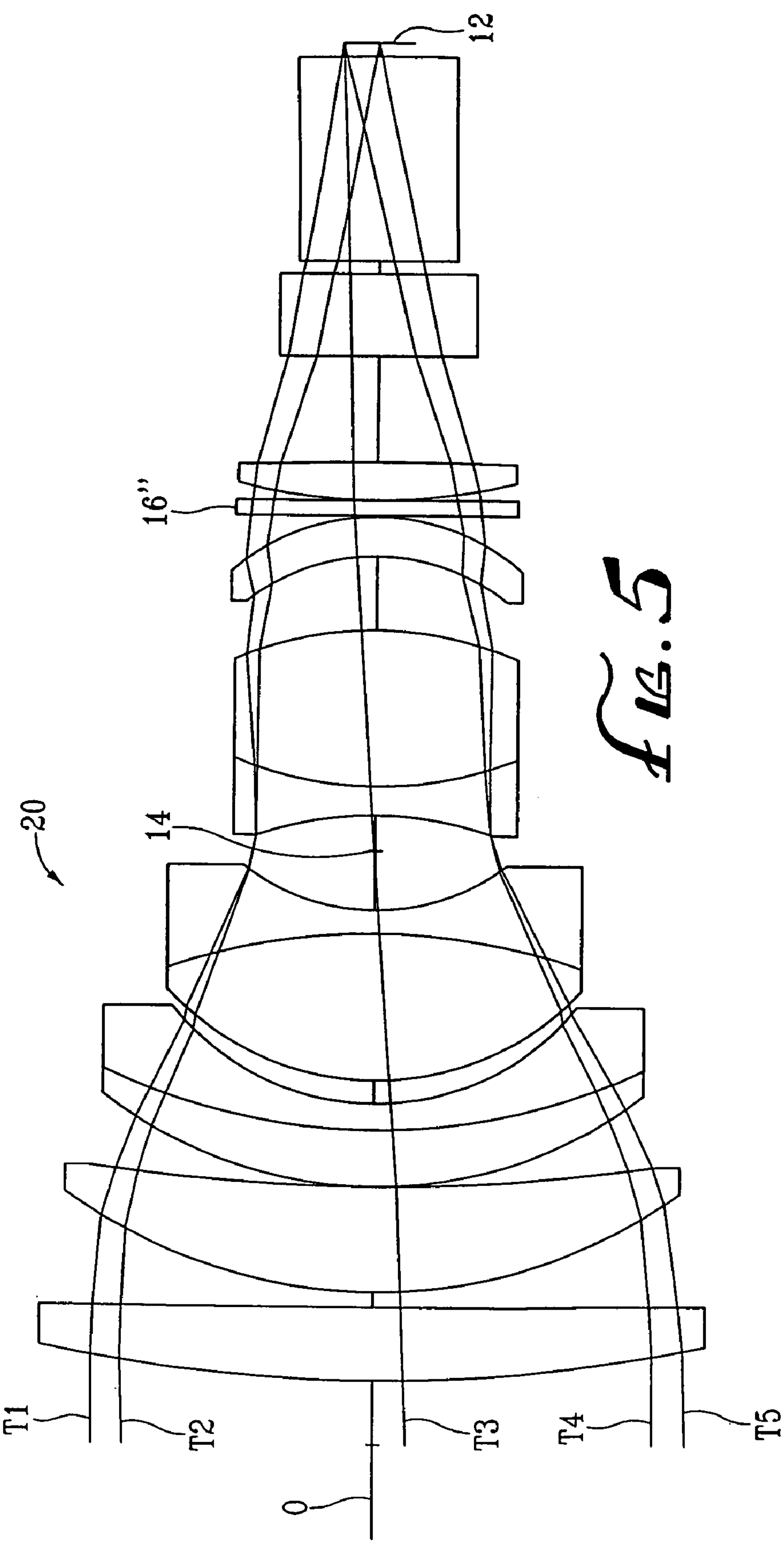
FIG. 5 is an optical diagram of an objective lens of the prime type having a fixed focal length and incorporating the present invention.

Referring now to FIGS. 3 and 4, the high performance zoom lens 10 illustrated in these figures is the same as the zoom lens 10 illustrated in FIGS. 1 and 2 with the only difference being in the location of the interference filter optical element. Thus, all of the lens groups and other elements are the same in FIGS. 1–4 and will not be specifically described with respect to the embodiment of FIGS. 3 and 4. In this embodiment, interference filter optical element 16', comparable to optical element 16 in the first embodiment, is located at the front of the relay lens group R immediately behind the iris 14. Again, optical element 16' is preferably an optically flat element provided with the interference filter coating of the type described in U.S. Pat. No. 5,646,781 to modify the light for producing the predetermined spectrum of light rays desired to reach the electronic camera at the image plane 12. Preferably, the optical element 16' is removable and replaceable with other filter elements for producing other predetermined spectrums of light rays, including clear glass or other substrate that will not modify the spectrum of light rays reaching the electronic camera or change the optical characteristics of the lens. While the location of optical element 16' in this second embodiment is advantageous in that the element is smaller in diameter and therefore less costly, the location is somewhat less desirable because the maximum ray incidence angle is about 11.7 degrees from perpendicular rather than the maximum ray incidence angle of 4.7 degrees at the location of optical element 16 in the first embodiment, even though the 11.7 degrees is an acceptable magnitude below the desired maximum of 15 degrees for this type of interference filter coating.

Referring now to FIG. 5, the optical elements of a prime or fixed focal length lens 20 are diagrammatically shown for illustrating the incorporation of the present invention in a prime lens. Specifically, the illustrated prime lens 20 is a high performance lens having a fixed focal length of about 150 mm of the type that has been used for film cinematography. An iris 14 is provided in the usual manner and location and the lens 20 has an image plane 12 at the right hand end, as shown in FIG. 5. An interference filter optical element 16" is provided on the optical axis O of lens 20 at an appropriate location. Specifically, at the shown location of optical element 16," the light ray tracings (such as tracings T1–T5) are nearly collimated with the maximum deviation of a light ray tracing from parallel to the optical axis O being about 12.5 degrees, i.e. the maximum ray incident angle which is below the aforementioned acceptable light ray incidence angle of 15 degrees. As with the zoom lens 10 of FIGS. 1–4, the interference filter optical element 16" may be located elsewhere in the prime lens 20 if the maximum ray incidence angle does not exceed 15 degrees. In other prime or fixed focal length lenses, the interference filter optical element 16" may be positioned at a different location that may be more beneficial, such as requiring a smaller diameter of element or having a smaller maximum light ray incidence angle. Also, as with the embodiments of FIGS. 1–4, the optical element 16" may be provided with any appropriate interference filter coating for producing a predetermined spectrum of light rays for any desired purpose. Further, as with the embodiments of FIGS. 1–4, the interference filter coating may be provided on one of the surfaces of the normal optical elements of the lens 20 rather than on the separate optical element 16" if the lens 20 is going to be used only for specific purposes. However, as with the prior embodiments, it is preferable that the interference filter optical element 16" be removable and replaceable for allowing more versatile uses of the lens 20.

Thus, by the present invention, the spectrum of light rays received by a lens may be modified within the lens to a predetermined spectrum of light rays emerging at the image plane to be received by the charge couple devices of an electronic camera to thereby record the desired color spectrum for any purpose such as matching film, matching real colors, tinting, shading or the like. By using the interference filter element of the present invention, the quantity of light reaching the electronic camera is not objectionably reduced, as occurs with conventional absorption-type filters. While specific embodiments of this invention have been shown and described, it will readily appear to those skilled in the art that the invention is applicable to modifications and other arrangements including interference filter coatings of different compositions than disclosed in U.S. Pat. No. 5,646,781 that accomplish equivalent interference filtering and the use of other optical elements as a substrate incorporated in a lens, whereby this invention is of the full scope of the appended claims.

We claim:

1. In an objective zoom lens for an electronic camera, the objective zoom lens having a movable zoom lens group located between object space and an optical stop, and a relay lens group located between the optical stop and an image plane, an improvement comprising:

an optical element located within the relay lens group on an optical axis of the zoom lens, the optical element sandwiched between two adjacent lens elements of a substantially similar diameter located within the relay lens group that do not move with respect to each other such that the optical element will receive light rays substantially collimated and perpendicular to a surface of the optical element and parallel to the optical axis regardless of the movement of the zoom lens group, and a coating on said optical element surface forming an interference filter for causing a modification of the spectrum of light waves supplied to the camera in a manner for the camera to simulate a predetermined spectrum of light rays.

2. The objective zoom lens of claim 1, wherein said optical element surface is optically flat.

3. The objective zoom lens of claim 1, wherein said optical element is removable and replaceable from the objective zoom lens.

4. The objective zoom lens of claim 3, further including a replacement optical element having substantially the same optical characteristics and without said coating.

5. The objective zoom lens of claim 1, wherein said location along the optical axis is adjacent the optical stop of the objective zoom lens.

6. The objective zoom lens of claim 1, wherein said location along the optical axis allows zooming of the objective zoom lens by moving the zoom lens group without substantially changing an angle of incidence of the light rays on said surface.

7. The objective zoom lens of claim 1, wherein said coating includes layers of low refractive index material and layers of high refractive index materials for producing said predetermined spectrum of light rays.

8. In an objective zoom lens for an electronic camera, the objective zoom lens having a movable zoom lens group located between object space and an optical stop, and a relay lens group located between the optical stop and an image plane, an improvement comprising;

an optically flat optical element located within the relay lens group on an optical axis of the zoom lens and sandwiched between two adjacent lens elements of a substantially similar diameter located within the relay lens group that do not move with respect to each other such that the optical element will receive substantially collimated light rays substantially perpendicular to the optical element and parallel to the optical axis regardless of the movement of the zoom lens group, and a coating on said optical element forming an interference filter for causing a modification of the spectrum of light waves supplied to the camera in a manner for the camera to simulate a predetermined spectrum of light rays.

9. The objective zoom lens of claim 8, wherein said optical element is removable and replaceable from the objective zoom lens.

10. The objective zoom lens of claim 9, further including a replacement optical element having substantially the same optical characteristics and without said coating.

11. The objective zoom lens of claim 8, wherein said location along the optical axis is adjacent the optical stop of the objective zoom lens.

12. The objective zoom lens of claim 8, wherein said location along the optical axis allows zooming of the objective zoom lens by moving the zoom lens group without substantially changing an angle of incidence of the light rays on said surface.

13. The objective zoom lens of claim 8, wherein said coating includes layers of low refractive index material and layers of high refractive index materials for producing said predetermined spectrum of light rays.

14. A method for causing an electronic camera to sense and reproduce a predetermined spectrum of light rays, comprising the steps of:

providing the camera with an objective zoom lens having a movable zoom lens group located between object space and an optical stop, and a relay lens group located between the optical stop and an image plane, providing an optical element surface located within the relay lens group and sandwiched between two adjacent lens elements of a substantially similar diameter located within the relay lens group that do not move with respect to each other at a location where the light rays are substantially collimated and perpendicular to the optical element surface and parallel to an optical axis regardless of the movement of the zoom lens group, and providing the optical element surface with a coating forming an interference filter for modifying the spectrum of light rays to the predetermined spectrum for supplying to the camera.

15. The method according to claim 14, including the step of removing and replacing the optical element having said surface with another optical element having a surface with a different coating forming an interference filter for modifying the spectrum of light rays to a different predetermined spectrum.

16. The method according to claim 14, including the step of selecting said coating for said optical element surface for modifying the spectrum of light rays to simulate the predetermined spectrum of a film emulsion of film for a film camera.

17. The method according to claim 14, including the step of selecting the location of the optical element surface within the relay lens group on the basis of the location having minimum ray incident angles at the surface.

18. The method according to claim 17, wherein the maximum ray incident angle on the surface is 15°.

19. A method for causing an electronic camera to sense and reproduce a predetermined spectrum of light rays, comprising the steps of:

providing the camera with an objective zoom lens having a movable zoom lens group located between object space and an optical stop, and a relay lens group located between the optical stop and an image plane, providing an optical element located within the relay lens group sandwiched between two adjacent lens elements of a substantially similar diameter located within the relay lens group that do not move with respect to each other at a location of substantially collimated light rays substantially perpendicular to the optical element and parallel to an optical axis regardless of the movement of the zoom lens group, and providing the optical element with a coating forming an interference filter for modifying the spectrum of light rays to the predetermined spectrum for supplying to the camera.

20. The method according to claim 17, wherein the optical element is optically flat.

21. An objective zoom lens having a movable zoom lens group located between object space and an optical stop, and a relay lens group located between the optical stop and an image plane for causing an electronic camera to sense and reproduce a predetermined spectrum of light rays, comprising:

an optical element located within the relay lens group sandwiched between two adjacent lens elements of a substantially similar diameter located within the relay lens group that do not move with respect to each other at a location of substantially collimated light rays substantially perpendicular to the optical element and parallel to an optical axis regardless of the movement of the zoom lens group, and a coating on said optical element forming an interference filter for modifying the spectrum of light rays to the predetermined spectrum for supplying to the camera.

22. In an objective zoom lens for an electronic camera, the objective zoom lens having a movable zoom lens group located between object space and an optical stop, and a relay lens group located between the optical stop and an image plane, a method for performing spectral filtering on light rays received into the objective zoom lens and maintaining that spectral filtering throughout zooming of the objective zoom lens, the method comprising:

coating a surface of an optical element to form an interference filter for causing a modification of a spectrum of the light rays received into the objective zoom lens;

identifying a location within the relay lens group between two adjacent lens elements of a substantially similar diameter that do not move with respect to each other at which the light rays are substantially collimated and parallel to an optical axis, regardless of the movement of the zoom lens group; and placing an optical element at the location, the optical element sandwiched between the two adjacent lens elements and orienting the optical element such that the light rays are perpendicular to the surface of the optical element regardless of the movement of the zoom lens group.

* * * * *